United States Patent
Schuhart et al.

(10) Patent No.: US 10,432,448 B2
(45) Date of Patent: Oct. 1, 2019

(54) SYSTEMS AND METHODS FOR STREAM-BASED, PROTOCOL-AGNOSTIC MESSAGING

(71) Applicant: SAP SE, Walldorf (DE)

(72) Inventors: Henrike Schuhart, Walldorf (DE);
Christoph Scheiber, Reilingen (DE);
Timur Fichter, Schwetzingen (DE);
Dirk Sabiwalsky, Sandhausen (DE);
Klaus Deissner, Offenbach an der Queich (DE)

(73) Assignee: SAP SE, Walldorf (DE)

( * ) Notice: Subject to any disclaimer, the term of this patent is extended or adjusted under 35 U.S.C. 154(b) by 168 days.

(21) Appl. No.: 15/643,103

(22) Filed: Jul. 6, 2017

(65) Prior Publication Data
US 2019/0013992 A1    Jan. 10, 2019

(51) Int. Cl.
| | |
|---|---|
| *H04L 29/06* | (2006.01) |
| *G06F 9/54* | (2006.01) |
| *G06F 13/42* | (2006.01) |
| *G06Q 10/10* | (2012.01) |
| *G06Q 10/06* | (2012.01) |
| *G06F 9/445* | (2018.01) |
| *H04L 12/18* | (2006.01) |

(Continued)

(52) U.S. Cl.
CPC .... *H04L 29/06074* (2013.01); *G06F 9/44521* (2013.01); *G06F 9/542* (2013.01); *G06F 9/546* (2013.01); *G06F 13/4217* (2013.01); *G06Q 10/06* (2013.01); *G06Q 10/10* (2013.01); *H04L 12/1859* (2013.01); *H04L 51/066* (2013.01); *H04L 67/1097* (2013.01); *H04L 67/26* (2013.01); *H04L 69/18* (2013.01)

(58) Field of Classification Search
CPC ... H04L 12/1859; H04L 51/066; H04L 67/26; H04L 67/1097; H04L 65/608; H04L 67/2842
See application file for complete search history.

(56) References Cited

U.S. PATENT DOCUMENTS

| | | | |
|---|---|---|---|
| 2009/0006560 A1* | 1/2009 | Bhogal | G06Q 10/107 709/206 |
| 2015/0244687 A1* | 8/2015 | Perez | H04L 63/0428 726/4 |

(Continued)

*Primary Examiner* — Chirag R Patel
(74) *Attorney, Agent, or Firm* — Buckley, Maschoff & Talwalkar LLC

(57) ABSTRACT

Sending and/or receiving messages in a computer system having memory and a processor. The method includes configuring the memory to have one or more streams connecting a generic messaging client to send messages to and/or receive messages from one or more protocol-specific messaging clients. The streams are formed by providing configuration data comprising one or more destination definitions. Each of the destination definitions corresponds to one of the protocol-specific messaging clients. Each of the destination definitions has a specified messaging protocol and one or more stream definitions. Each of the stream definitions has parameters associated with the specified messaging protocol of a corresponding one of the destination definitions. In code for the generic messaging client, at least one stream object is provided specifying one of the destination definitions and one of the stream definitions.

19 Claims, 4 Drawing Sheets

(51) Int. Cl.
*H04L 12/58* (2006.01)
*H04L 29/08* (2006.01)

(56) References Cited

U.S. PATENT DOCUMENTS

2018/0007172 A1* 1/2018 Wang ................... H04L 69/02
2018/0167476 A1* 6/2018 Hoffner ................ H04L 67/26

* cited by examiner

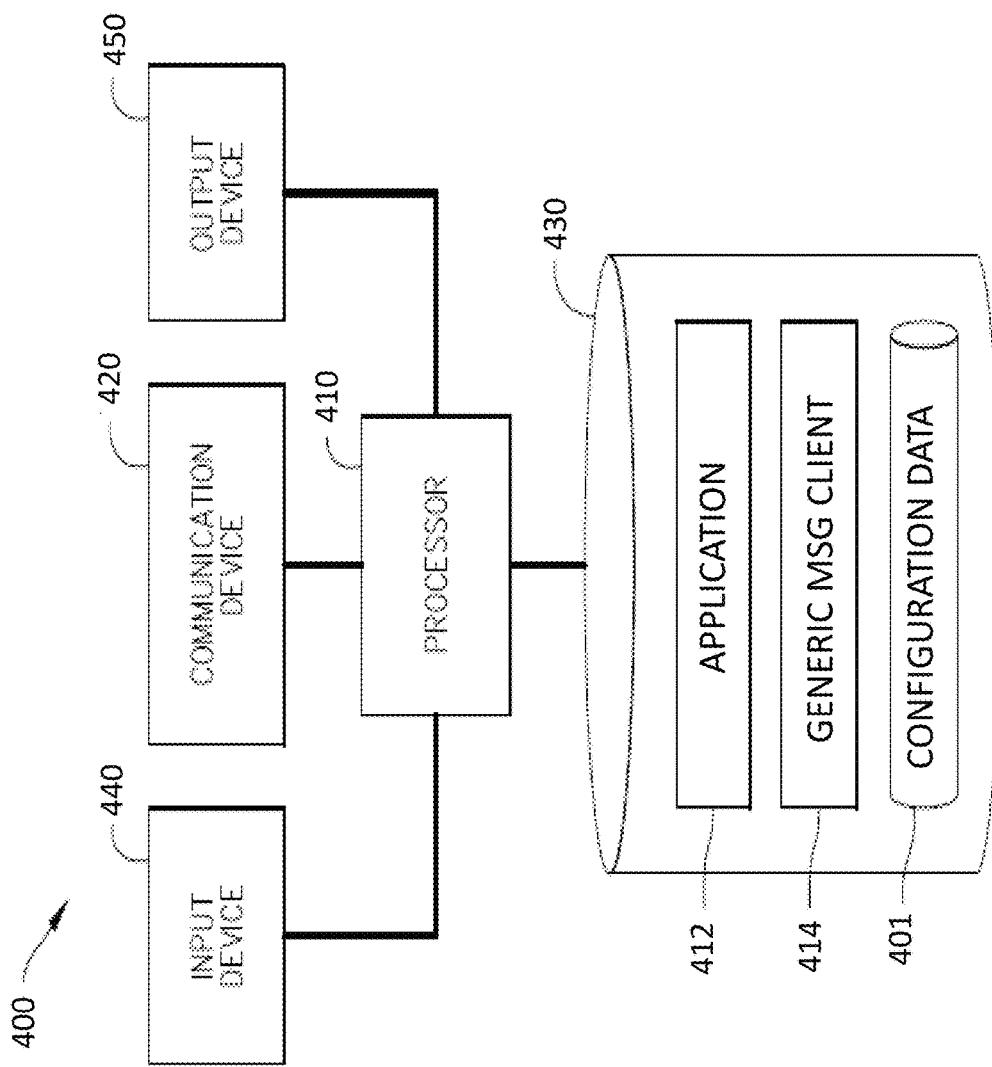

SYSTEMS AND METHODS FOR STREAM-BASED, PROTOCOL-AGNOSTIC MESSAGING

FIELD OF THE INVENTION

The disclosed embodiments are directed to stream-based, protocol-agnostic messaging. More specifically, the disclosed embodiments are directed to configuring one or more streams connecting a generic messaging client to send messages to and/or receive messages from one or more protocol-specific messaging clients.

BACKGROUND

Message-oriented middleware (MOM) is software or hardware infrastructure supporting sending and receiving messages between distributed systems. MOM allows application modules to be distributed over heterogeneous platforms and reduces the complexity of developing applications that span multiple operating systems and network protocols. The middleware creates a distributed communications layer that insulates the application developer from the details of the various operating systems and network interfaces. APIs that extend across diverse platforms and networks are typically provided by MOM.

In a publish-subscribe messaging model, subscribers typically receive only a subset of the total messages published. The process of selecting messages for reception and processing is called "filtering." There are two common forms of filtering: topic-based and content-based. In a topic-based system, messages are published to "topics," which are named logical channels. Subscribers in a topic-based system will receive all messages published to the topics to which they subscribe, and all subscribers to a topic will receive the same messages. The publisher is responsible for defining the classes of messages to which subscribers can subscribe. In a content-based system, messages are only delivered to a subscriber if the attributes or content of those messages match constraints defined by the subscriber. The subscriber is responsible for classifying the messages. Some systems support a hybrid of the two, i.e., publishers post messages to topics while subscribers register content-based subscriptions to one or more topics. In many publish-subscribe messaging systems, publishers post messages to an intermediary message broker or event bus, and subscribers register subscriptions with that broker, letting the broker perform the filtering. The broker normally performs a store and forward function to route messages from publishers to subscribers. In addition, the broker may prioritize messages in a queue before routing.

Many standardized, as well as proprietary, messaging protocols are currently in use. Consequently, conventional software applications must support multiple protocols to allow communication with different messaging brokers, such as Rabbit MQ, Active MQ, Mosquitto, Solace Appliance, and Solace Virtual Message Router (VMR). This increases the complexity of software applications which use messaging. For example, Message Queue Telemetry Transport (MQTT) is an ISO standard (ISO/IEC PRF 20922) publish-subscribe-based "lightweight" messaging protocol for use on top of Transport Control Protocol/Internet Protocol (TCP/IP). It is designed for connections with remote locations where a small code "footprint" is required or the network bandwidth is limited. The publish-subscribe messaging pattern requires a message broker. The broker is responsible for distributing messages to interested clients based on the topic of a message.

As a further example, the Advanced Message Queuing Protocol (AMQP) is an open standard application-layer protocol for message-oriented middleware. The defining features of AMQP are: message orientation, queuing, routing (including point-to-point and publish-and-subscribe), reliability, and security. AMQP mandates the behavior of the messaging provider and client to allow implementations from different vendors to be interoperable. Previous attempts to standardize middleware have been implemented at the application program interface (API) level (e.g., Java Message Service) and have been focused on standardizing programmer interaction with different middleware implementations, rather than on providing interoperability between multiple implementations. Unlike JMS, which defines an API and a set of behaviors that a messaging implementation must provide, AMQP is a wire-level protocol. A wire-level protocol is a description of the format of the data that is sent across the network as a stream of bytes. Consequently, any tool that can create and interpret messages that conform to this data format can interoperate with any other compliant tool irrespective of implementation language. There are two widely used versions of this protocol, AMQP v0.9.1, and AMQP v1.0.0, each of which has rather different configuration requirements.

Conventional message protocols, e.g., MQTT and AMQP, are standardized and each has a specific behavior, specific models, and specific ways to support messaging. Therefore, a coder must develop software capable of handling one particular protocol, or perhaps more than one, by creating code to implement each desired protocol. Furthermore, specific configuration data must be stored and made accessible for each protocol.

SUMMARY

In disclosed embodiments, applications are independent with respect to protocol and broker, which makes development of message-based software less complicated. Furthermore, taking cloud environments into account, disclosed embodiments provide the capability to easily change messaging brokers and protocols, based on performance and volume requirements, without changing application code. In disclosed embodiments, different messaging protocols can be used by adapting configuration data with no need to change application software. In disclosed embodiments, it is possible to use protocol-specific features to guarantee optimized message processing, such as, for example, optimized frame size.

Disclosed embodiments provide a stream-based application programming interface API, which provides flow-control and needs only basic data, e.g., the payload and acknowledge callbacks, via the API. Other settings are stored as configuration data, such as, for example, topic names, patterns, quality of service (QoS), and broker-specific settings. For example, in disclosed embodiments, for AMQP v0.9.1, the definition of a routing key and exchange, etc., are stored as configuration data. Implementations are possible in different environments and programming languages, such as, for example Node.js/SAP HANA XS Advanced (XSA).

In disclosed embodiments, different messaging protocols are supported with one common stream-based API, which: hides protocol-specific features; is sufficient for typical simple applications that consume, produce or transform messages; and provides named streams as input and/or output. Protocol-specific configuration information is separated from application code to: take settings from the runtime environment; minimize the effort to switch the application from one protocol to another, such as when, for example, changing from one message broker to another; and avoid code changes and redeployment of applications if a protocol or broker is changed.

In one aspect, the disclosed embodiments provide a method, and corresponding system, for sending and/or receiving messages in a computer system having memory and a processor. The method includes configuring the memory to have one or more streams connecting a generic messaging client to send messages to and/or receive messages from one or more protocol-specific messaging clients. The streams are formed by providing configuration data comprising one or more destination definitions. Each of the destination definitions corresponds to one of the protocol-specific messaging clients. Each of the destination definitions has a specified messaging protocol and one or more stream definitions. Each of the stream definitions has parameters associated with the specified messaging protocol of a corresponding one of the destination definitions. In code for the generic messaging client, at least one stream object is provided specifying one of the destination definitions and one of the stream definitions.

The disclosed embodiments may include one or more of the following features. Each of the destination definitions may include a network host and a port. Each of the stream definitions may include a stream name and a message topic parameter. The stream object wherein said stream object is created based on the configuration data provided via a client options object. The forming of the streams may include providing, in the code for the generic messaging client, a stream converter which pipes a converted input stream to an output stream. The stream converter may perform a mathematical operation on values in the input stream to produce corresponding converted values in the output stream.

BRIEF DESCRIPTION OF THE DRAWINGS

FIG. 4 is a block diagram of an apparatus according to disclosed embodiments.

DETAILED DESCRIPTION

The disclosed embodiments provide stream-based protocol-agnostic messaging. Multiple messaging protocols are supported by the disclosed messaging system so software developers can easily integrate broker-based messaging. An advantage of the disclosed messaging system is that it allows for switching between different brokers and protocols via configuration changes, rather than changes to application code.

Figure 1:
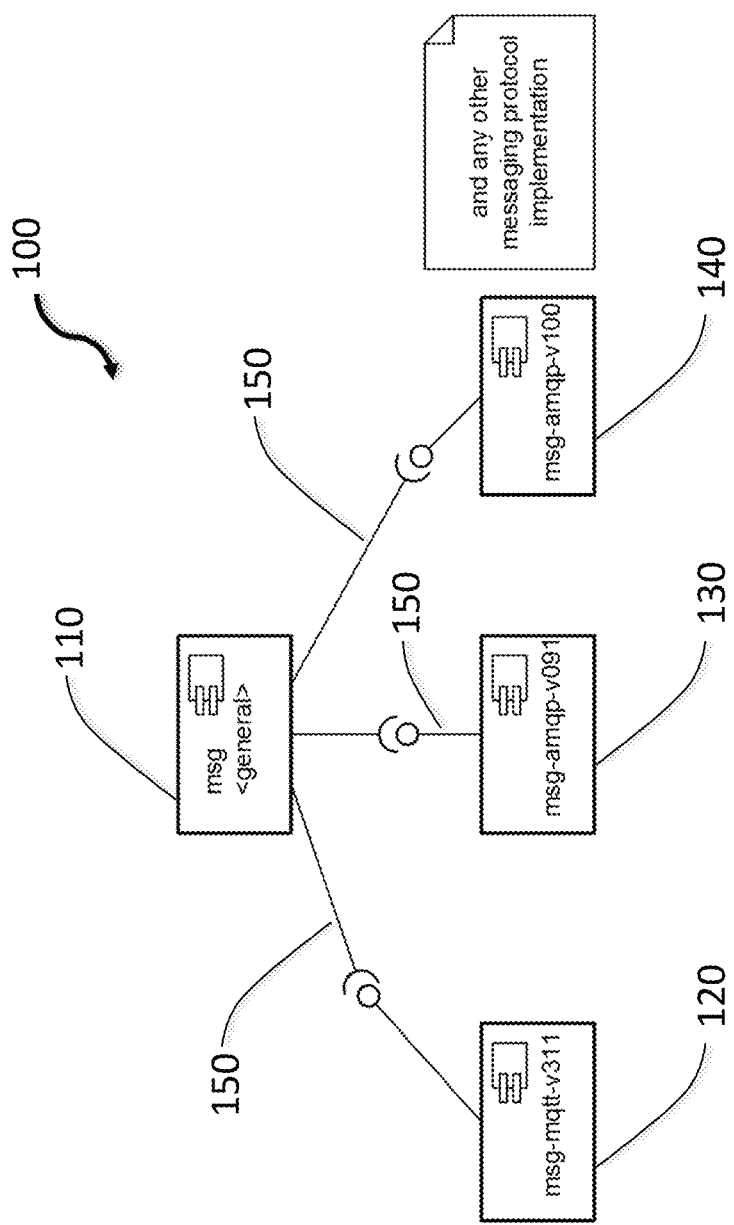
FIG. 1 depicts a general messaging component interfacing with a number of protocol-specific messaging components.

FIG. 1 depicts a system 100 in which a general messaging component 110 interfaces with a number of protocol-specific messaging components (120, 130, 140), i.e., messaging clients. For each supported protocol/broker, a specific component is implemented, such as, for example, MQTT v3.1.1, AMQP v0.9.1, and AMQP v1.0.0. The interface used by the general component 110 (i.e., the "msg" component) allows for a messaging client (120, 130, 140) to be created via changes in configuration. As discussed in further detail below, the messaging clients (120, 130, 140) can create streams 150 for input and output.

By virtue of this configuration, an application written for a cloud environment, or other type of node-based environment, could receive messages from a broker using a particular protocol and output the messages using a different protocol. For example, the node could receive messages from an MQTT-based broker which have been delivered to the MQTT broker from a number of devices. The application may consume, validate, and transform the messages in various ways and then output the messages to a queue using, e.g., a version of AMQP. This is but one of many possible configurations in which an application can make use of messaging clients having different messaging protocols. An application may receive messages, transform data, produce messages, and/or perform a database update, etc., using a combination of protocols. Each of the messaging clients provides an application program interface (API) which conforms to a particular protocol. The messaging clients communicate with a common, general messaging client which provides a common basis for stream handling between itself and the protocol-specific messaging clients.

Figure 2:
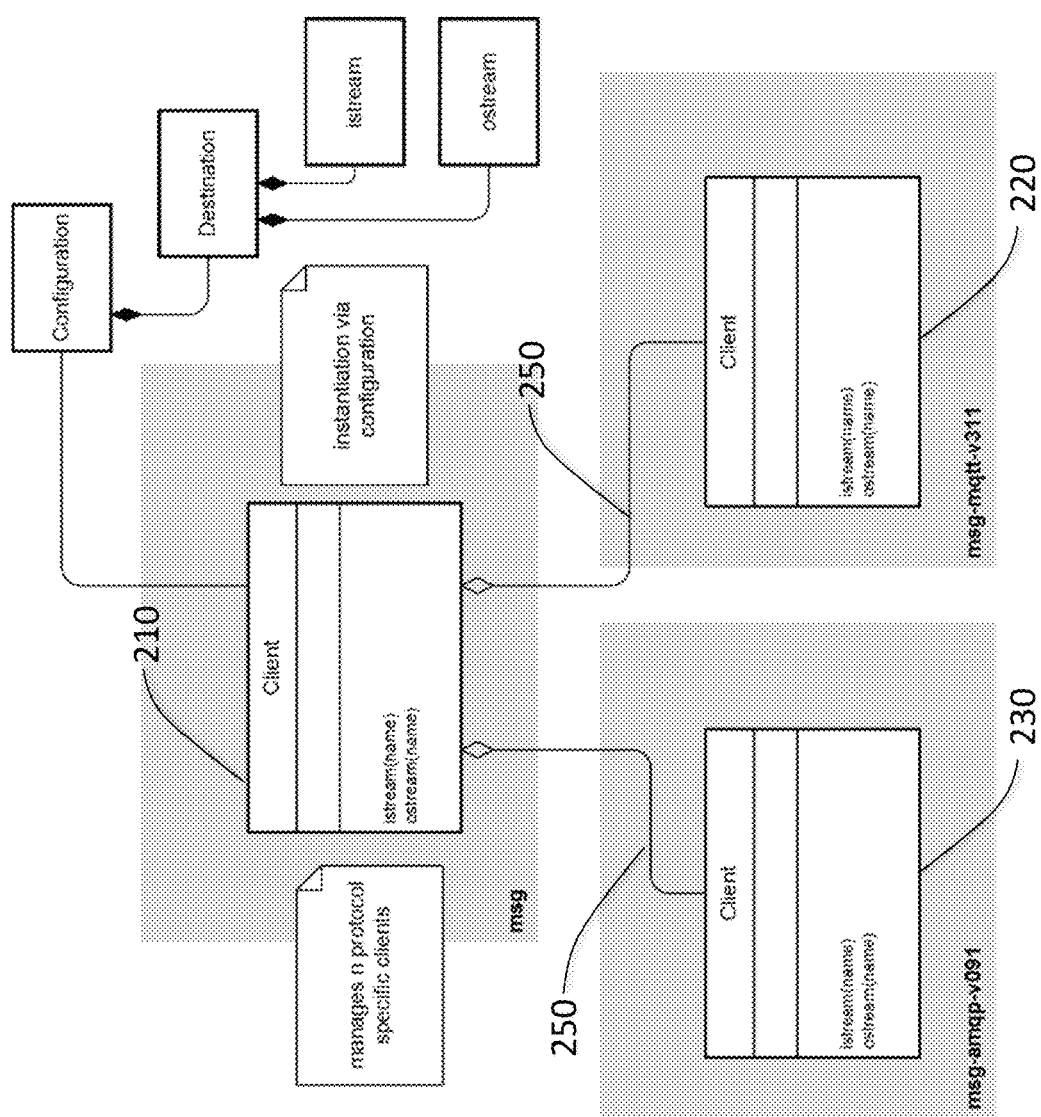
FIG. 2 is a class diagram showing a generic messaging client connected to two protocol-specific messaging clients by streams.

FIG. 2 is a class diagram showing a generic messaging component 210, i.e., client, connected to two protocol-specific messaging clients (220, 230) by streams 250. Streams are objects that allow data to be read from a source or written to a destination in a continuous fashion. In Node.js, for example, there are four types of streams: readable, writable, duplex (which can be used for both read and write operations), and transform (which is a type of duplex stream where the output is computed based on the input). Node.js is an open source JavaScript-based framework/platform which is typically used to develop input/output-intensive web applications such as video streaming sites, single-page applications, and other web applications. Stream-based embodiments disclosed herein provide, inter alia, flow control and seamless integration with other types of streams, such as non-messaging streams (e.g., streams for piping operations).

The generic messaging client 210 ("msg") is a stream-based client, which owns, i.e., provides or contains, one or more protocol-specific clients, e.g., an MQTT v3.1.1 protocol client 220 and an AMQP v0.9.1 client 230. The protocol-specific clients (220, 230) provide all of the protocol-specific settings and in-stream and out-stream definitions. The common, generic client 210 is a steam-based client which is exposing the streams 250 defined by the protocol-specific clients (220, 230) via an application program interface (API). This provides a simple and unified API to the application regardless of the specific protocols being employed. Furthermore, the generic client 210 is not consuming additional computing time versus a conventional protocol-specific client.

The general messaging client 210 (msg) may manage n specific clients, each having specific input and/or output streams. A client is instantiated by passing a configuration. The configuration may define n destinations (where n is an integer), each of which corresponds to a particular broker destination (e.g., host, port, broker or protocol type and a unique name). Each destination may list p input and q output streams (where p and q are integers). While the input streams correspond to messaging subscriptions at the parent broker destination, the output streams correspond to publish/produce messaging targets. Each stream provides a unique name—other settings are protocol and broker-specific and may differ. Thus, for each destination, multiple inbound as well as outbound streams may be defined, providing detailed protocol-specific settings and a locally unique name to identify each stream. An application may use the streams to consume or produce independently from one another or may also use stream-like processor objects that pipe a converted input stream to an output stream, as discussed in further detail below.

In disclosed embodiments, a configuration data structure, such as, for example, a JSON string tree (see listing below) can be used to create protocol-specific message clients and their connections, thereby simplifying unified access and allowing an application to start using the defined streams without regard to protocol. In this example, the configuration defines two destinations: the first destination is based on the AMQP protocol; and the second destination is based on MQTT. The AMQP connection identifies a particular host (e.g., "host": "<host1>") and port (e.g., "port": 5672). Configuration elements are provided to handle user credentials (e.g., "mechanism": "PLAIN", "user": "guest", "password": "guest") and a logon message for Simple Authentication and Security Layer (SASL), which is a framework for authentication and data security in Internet Protocol networks. The AMQP configuration defines a vhost, i.e., a virtual host, which is used to log on to a message broker. The AMQP configuration also provides a definition for an input stream ("in1"), which is based on a particular channel ("channel": 1), routing key ("routingKey": "topic.test0"), and exchange ("exchange": "amq.topic"). An application can access this input stream at runtime using the name ("in1") of the stream.

The following is an example, discussed above, of a configuration in the form of a JSON string tree:

```
{
    "destinations": [
        {
            "name": "destination1",
            "type": "amqp-v091",
            "net": {
                "host": "<host1>",
                "port": 5672
            },
            "sasl": {
                "mechanism": "PLAIN",
                "user": "guest",
                "password": "guest"
            },
            "amqp": {
                "vhost": "/",
                "locale": "en_US",
                "heartbeatInterval": 60
            },
            "istreams": {
                "in1": {
                    "channel": 1,
                    "exchange": "amq.topic",
                    "routingKey": "topic.test0"
                }
            }
        },
        {
            "name": "destination2",
            "type": "mqtt-v311",
            "net": {
                "host": "<host2>",
                "port": 1883
            },
            "mqtt": {
                "user": "admin",
```

-continued

```
                "password": "admin",
                "clientID": "",
                "keepAlive": 60
            },
            "istreams": {
                "in2": {
                    "topic": "topic/test0",
                    "qos": 0
                }
            },
            "ostreams": {
                "out2": {
                    "topic": "topic/test1",
                    "qos": 0
                }
            }
        }
    ]
}
```

The second destination defined in the example configuration shown above is based on MQTT, which has settings which are different from those used for AMQP, although some of the parameters are similar. For example, the MQTT definition includes a client ID and a user password. Some settings are set to default values and may not be necessary for a typical use case. The second destination, which becomes a connection at runtime, has an input stream ("in2") and an output stream ("out2"). In disclosed embodiments, the default and/or mandatory parameters are included in the configuration file. The protocols each may have additional parameters which are not necessary for the functionality described herein. In disclosed embodiments, the configuration data of the messaging system can define all of the protocol-specific capabilities. The disclosed broker-based messaging system supports well-known messaging patterns, such as, for example, the consumer, producer, and transformer/converter patterns.

Figure 3:
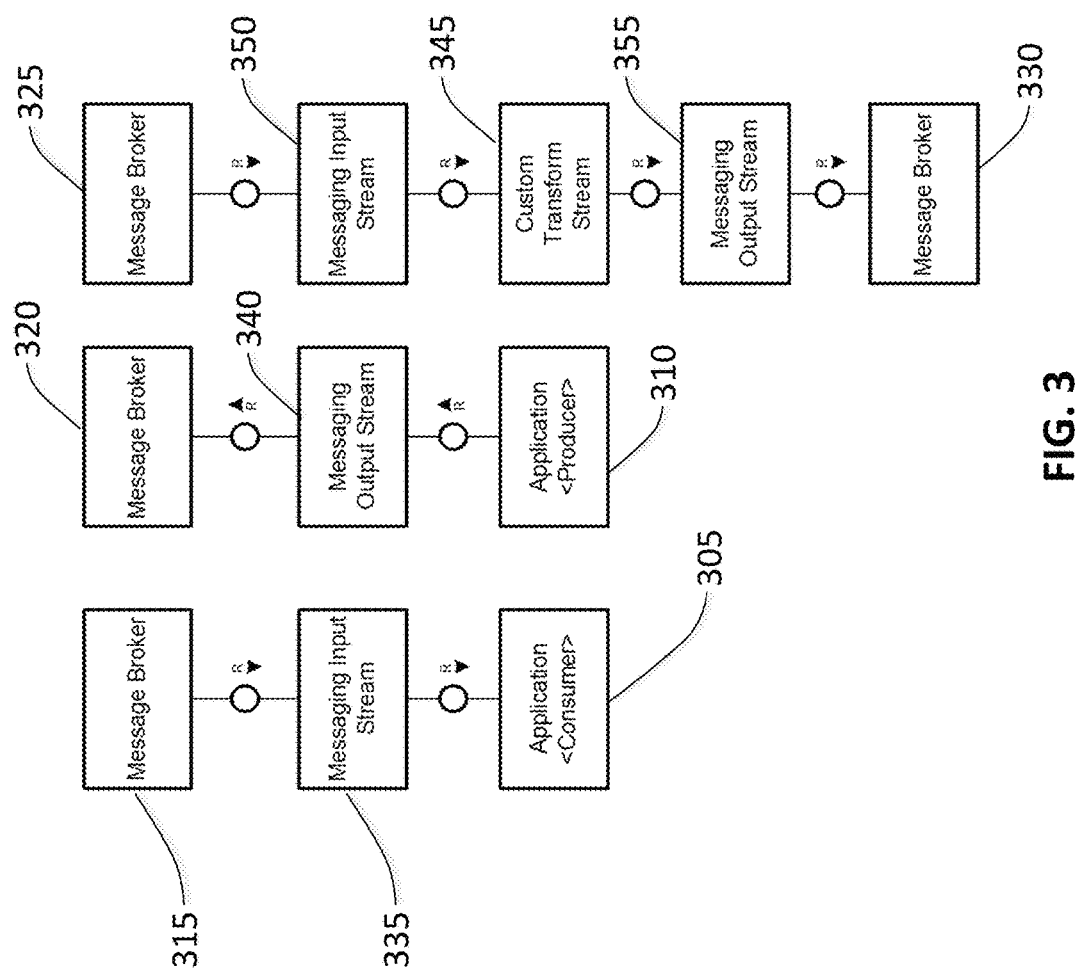
FIG. 3 depicts embodiments of an application using a generic messaging client to communicate with one or more message brokers, which may use various messaging protocols.

FIG. 3 depicts embodiments of an application (305, 310) using a generic messaging client to communicate with one or more message brokers (315, 320, 325, 330), which may use various messaging protocols. A conventional message broker may be implemented using commercially-available products, such as Rabbit MQ, Active MQ, and Solace VMR or Appliance. In the depicted embodiments, a message broker may act as a central point of exchange, for example, to forward message from message producers (e.g., 310) to message consumers (e.g., 305). A number of applications may be interacting with the message brokers, each application acting as a message consumer, message producer, or both.

The generic, i.e., protocol-independent, client is in a sense a facade to the protocol-specific clients, e.g., message brokers (315, 320, 325, and 330), which each provide a protocol-specific stream implementation. The configurations of these stream implementations differ according to the particular protocol, but their behavior from the standpoint of an application is the same.

Below is an example of an application which makes use of the generic messaging client. The specifics of the "send" function are not shown here for the sake of simplicity. The function writes data to the stream instance "MyOutB". In this example, all protocol-specific settings have been moved to the client options object. These options are based on configuration and are provided at runtime via the application environment. In the example below, "xb-msg" bundles different protocol-specific clients into one protocol-agnostic client; and "xb-msg-env" provides functions to read settings/ configuration data from cloud environment (e.g., Cloud Foundry) or from XSA environment alternatively, which emulates CF in an on-premise environment. This has the effect of providing the client options, which are used to form a stream object.

```
const msg = require('@sap/xb-msg');
const env = require('@sap/xb-msg-env');
/* get options from cf/xsa environment */
const options = env.msgClientOptions('rabbit-01', ['MyInpA'],
    ['MyOutB']);
/* start messaging */
const client = new msg.Client(options);
const stream = client.ostream('MyOutB');
stream
    .on ('ready', ( ) => {
        send ( );
    })
    .on ('drain', ( ) => {
        send ( );
    })
    .on('error', (error) => {
        console.log(error);
    });
client.connect ( );
```

In disclosed embodiments, an application 305 with a generic messaging client may be a consumer of messages sent by a message broker 315. The messages are received from the broker 315 as a protocol-specific messaging stream which is exposed to the application 305 via an API as a generic messaging input stream 335. The messaging input stream is produced by an arrangement of a generic messaging client (e.g., 210) and one or more protocol-specific messaging clients (e.g., 220, 230) (see FIG. 2). An application 310 with a generic messaging client may also be a producer of messages sent to a message broker 320. The messages are output by the application 310 via an API as a generic messaging output stream 340, which is sent to the broker 320 as a protocol-specific messaging stream. The messaging output stream 340 is transformed into the protocol-specific messaging stream by an arrangement of a generic messaging client and one or more protocol-specific messaging clients, e.g., as depicted in FIG. 2.

In disclosed embodiments, a transform stream 345 may be configured to perform a particular transformation of a message stream received from a first message 325 broker and send the transformed stream to a second message broker 330, which may be the same as or different from the first message broker. The transform stream conversion node receives and transmits the transformed streams as generic messaging input streams 350 and generic messaging output streams 355, as described above.

The disclosed embodiments thus provide a generic messaging interface to the developer. Therefore, the developer can produce program code based on a particular interface and stream configuration, without regard to protocol-specific configurations and requirements. In other words, the developer can program in a protocol-agnostic environment. The protocol-specific configurations may be stored or loaded at runtime and used for a number of different messaging brokers. Consequently, the application becomes, to a certain degree, independent from how the input or output is realized.

In addition to providing message streams, conventional message brokers commonly provide message queues. The generic messaging interface is able to provide, in conjunction with the messaging broker, queues with persistency so that, instead of just publishing to topics, an application can also consume messages from queues and/or write messages to queues. Consequently, by making a configuration change, it is possible to change the binding so that an application produces to a queue instead of producing to a topic. Likewise, the configuration could be changed so that the application consumes from a queue instead of from a topic.

In disclosed embodiments, a stream interface between a generic messaging client and a protocol-specific messaging client can provide data conversion. For example, the speed of a car in kilometers per hour (km/h) in received messages can be converted into miles per hour (mph) in messages output to a destination (see below). Notably, the conversion is based on a configuration rather than being part of the application code.

In this example, a class ("converter") is created which inherits from a base class ("transform"). Although node.js is used in this example, other languages have similar architectural elements. The "converter" class adds particular default settings to the "transform" base class, i.e., it "extends" the base class and defines parameter values for its constructor. For example, highWaterMark is used to define buffer size and readableObjectMode and writableObjectMode are used to indicate that objects (i.e., messages) are to be input and output, rather than binary data. As discussed in further detail below, a configuration file ("stream-convert-amqp-no-ack") is included which defines parameters for the protocol-specific client and corresponding streams.

The class conversion implements the conversion of the contents of the stream, i.e., the messages, from km/h to mph ("data.velocity/=1.60934; data.uom='m/h'"). Furthermore, a client is created which pipes an input stream ("MyInpA") into the converter and pipes the output to an output stream ("MyOutA"). Conventional approaches to messaging require flow control to adjust processing speeds to the speed of the network. In the disclosed embodiments, messages are streamed, which means that the processing speed depends on network speed and the message processing rate of the message broker(s). Thus, the disclosed embodiments provide flow control without requiring application code developed specifically for that purpose. The following is an example, using Node.js, of a stream conversion:

```
'use strict';
const Transform = require('stream').Transform;
const MSG = require(require('../'));
const Statistics = require('./util/statistics').ConsumeStatistics;
const options = process.argv.length > 2 ? require(process.argv[2]) :
require ('./cfg/stream-convert-amqp-no-ack');
const maxCount = 100000; const logCount = 1000;
const statistics = new Statistics (maxCount, logCount);
class Converter extends Transform {
    constructor( ) {
        super({
            highWaterMark: 500,
            decodeString: false,
            allowHalfOpen: false,
            readableObjectMode: true,
            writableObjectMode: true,
            transform(message, encoding, callback) {
                try {
                    const data =
JSON.parse(message.payload.toString( ));
                    data.velocity /= 1.60934; data.uom = 'm/h';
                    const result = { payload :
Buffer.from(JSON.stringify(data)) };
                    callback(null, result);
                } catch (e) {
                    callback(e, message);
                }
            }
```

```
        }) ;
    }
}
const client = new MSG.Client(options);
client.istream('MyInpA').pipe(new
Converter( )).pipe(client.ostream('MyOutA'));
client.istream('MyInpA')
    .on('subscribed', ( ) => {
        console.log('subscribed');
    })
    .on('data', (message) => {
        switch (statistics.onReceive( )) {
            case statistics.COUNT:
                message.done( );
                return;
            case statistics.COUNT_LOG:
                console.log(statistics.count( ));
                message.done( );
                return;
            case statistics.UNSUBSCRIBE:
                console.log(statistics.count ( ));
                message.done( );
                client.disconnect( );
                return;
            case statistics.COOLDOWN:
                message.done( );
                return;
        }
    }) ;
client
    .on('connected', ( ) => {
        console.log('connected');
    })
    .on('error', (err) => {
        console.log(err);
    })
    .on('disconnected', ( ) => {
        console.log('disconnected');
        statistics.print( );
    });
client.connect( );
```

As noted above, a configuration ("stream-convert-no-ack.js") is referred to, i.e., included, in the generic message client script to define parameters for the protocol-specific client and corresponding streams (see below). The configuration provides a defined destination ("broker-01"), which may be, for example, a message broker. The connection to the message broker uses AMQP v0.9.1. An input stream ("MyInpA") and an output stream ("MyOutA") are defined. The input stream is configured to receive the car velocity in kilometers per hour and the output stream is configured to output the car velocity in miles per hour.

```
'use strict';
module.exports = {
    destinations : [
        {
            name: 'broker-01',
            type: 'amqp-v091',
            net: {
                host        : '127.0.0.1',
                port        : 5672
            },
            sasl: {
                user        : 'guest',
                password    : 'guest'
            },
            amqp: {
                vhost       : '/',
            },
            istreams        : {
                MyInpA      : { channel : 1, exchange :
'amq.topic', routingKey : 'Cars.Velocity.kilometersPerHour', noAck :
true }
            },
            ostreams        : {
                MyOutA      : { channel : 1, exchange :
'amq.topic', routingKey : 'Cars.Velocity.milesPerHour', confirms :
false }
            },
        }
    ]
};
```

The following example is code which could be used in a generic messaging client of an application to produce data streamed to a protocol-specific client. In this example, the protocol is MQTT and the data is output via an output stream named "MyOutA".

```
'use strict';
const MSG = require('../');
const Statistics = require('./util/statistics').ProduceStatistics;
const options      = process.argv.length > 2 ?
require(process.argv[2]) : require('./cfg/mqtt-produce-at-most-
once');
const measurement = { velocity : 0, uom : 'km/h' };
const maxCount = 100000;
const statistics = new Statistics(maxCount);
const client = new MSG.Client(options);
const stream = client.ostream('MyOutA');
function send( ) {
    statistics.onSend( );
    let noPause = true;
    while (noPause && statistics.countMessage( )) {
        measurement.velocity = Math. random( ) * 100;
        noPause = stream.write({payload :
Buffer.from(JSON.stringify(measurement)), done :
statistics.onDone});
    }
    if (noPause) {
        statistics.onStop( );
    } else {
        statistics.onWait( );
        console.log('wait');
    }
}
statistics
    .on('done', ( ) => {
        console.log('done');
        client.disconnect( );
    }) ;
stream
    .on('ready', ( ) => {
        console.log('ready');
        send( );
    })
    .on('drain', ( ) => {
        console.log('continue');
        send( );
    })
    .on('error', (error) => {
        console.log(error);
    });
client
    .on('connected', ( ) => {
        console.log('connected');
    })
    .on('error', (err) => {
        console.log(err);
    })
    .on('disconnected', ( ) => {
        console.log('disconnected');
        statistics.print( );
    });
client.connect( );
```

The following is the configuration ("mqtt-produce-at-most-once.js") referred to, i.e., included, in the code above. The configuration has one destination definition, "broker- 01," which is associated with MQTT v3.1.1 protocol. One output stream is defined, "MyOutA."

```
'use strict';
module.exports = {
    destinations : [
        {
            name: 'broker-01',
            type: 'mqtt-v311',
            net: {
                host            : '127.0.0.1',
                port            : 1883
            },
            credentials: {
                user            : '',
                password        : ''
            },
            mqtt: {
                clientID        : '',
                keepAlive       : 60
            },
            ostreams            : {
                MyOutA          : { topic : 'Cars/Velocity/kilometersPerHour', qos : 0 }
            },
        }
    ]
};
```

The following example is code which could be used in a generic messaging client to consume data streamed from a protocol-specific client. In this example, the protocol is MQTT and the data is received via an input stream named "MyInpA".

```
'use strict';
const MSG = require('../');
const Statistics = require('./util/statistics').ConsumeStatistics;
const options = process.argv.length > 2 ? require(process.argv[2]) : require('./cfg/mqtt-consume-at-most-once');
const maxCount = 100000; const logCount = 1000;
const statistics = new Statistics(maxCount, logCount);
const client = new MSG.Client(options);
const stream = client.istream('MyInpA');
stream
    .on('subscribed', ( ) => {
        console.log('subscribed');
    })
    .on('data', (message) => {
        switch (statistics.onReceive( )) {
            case statistics.COUNT:
                message.done( );
                return;
            case statistics.COUNT_LOG:
                console.log(statistics.count( ));
                message.done( );
                return;
            case statistics.UNSUBSCRIBE:
                console.log(statistics.count( ));
                message.done( );
                client.disconnect( );
                return;
            case statistics.COOLDOWN:
                message.done( );
                return;
        }
    });
client
    .on('connected', ( ) => {
        console.log('connected');
    })
    .on('error', (err) => {
        console.log(err);
    })
    .on('disconnected', ( ) => {
        console.log('disconnected');
        statistics.print( );
```

-continued
```
    });
client.connect( );
```

The following is the configuration ("mqtt-consume-at-most-once.js") referred to, i.e., included, in the code above. The configuration has one destination definition, "broker-01," which is associated with MQTT v3.1.1 protocol. One input stream is defined, "MyInpA."

```
'use strict';
module.exports = {
    destinations : [
        {
            name: 'broker-01',
            type: 'mqtt-v311',
            net: {
                host            : '127.0.0.1',
                port            : 1883
            },
            credentials: {
                user            : '',
                password        : ''
            },
            mqtt: {
                clientID        : '',
                keepAlive       : 60
            },
            istreams            : {
                MyInpA          : { filter : 'Cars/Velocity/+', qos : 0 }
            },
        }
    ]
};
```

The following example, "amqp-consume-no-ack.js," is a configuration having one destination definition, "broker-01", which is associated with AMQP v0.9.1. There is one input stream definition, "MyInpA."

```
'use strict';
module.exports = {
    destinations : [
        {
            name: 'broker-01',
            type: 'amqp-v091',
            net: {
                host            : '127.0.0.1',
                port            : 5672
            },
            sasl: {
                user            : 'guest',
                password        : 'guest'
            },
            amqp: {
                vhost           : '/',
            },
            istreams            : {
                MyInpA          : { channel : 1, exchange : 'amq.topic', routingKey : 'Cars.Velocity.*', noAck : true }
            },
        }
    ]
};
```

The following example, "multi-destination-consume.js," depicts a configuration having multiple inputs from different sources. Two destinations are defined, "broker-01" and "broker-02", which are associated with AMQP v0.9.1 and MQTT v3.1.1 protocol, respectively. In this example, the destination definitions are associated with different ports of the same host. Each destination definition has an input stream, "MyInpA" and "MyInpB," respectively.

```
'use strict';
module.exports = {
    destinations : [
        {
            name: 'broker-01',
            type: 'amqp-v091',
            net: {
                host        : '127.0.0.1',
                port        : 5672
            },
            sasl: {
                user        : 'guest',
                password    : 'guest'
            },
            amqp: {
                vhost       : '/',
            },
            istreams        : {
                MyInpA      : { channel : 1, exchange :
'amq.topic', routingKey : 'Cars.Velocity.*', noAck : true }
            },
        },
        {
            name: 'broker-02',
            type: 'mqtt-v311',
            net: {
                host        : '127.0.0.1',
                port        : 1883
            },
            credentials: {
                user        : '',
                password    : ''
            },
            mqtt: {
                clientID    : '',
                keepAlive   : 60
            },
            istreams        : {
                MyInpB      : { filter : 'Cars/Velocity/+', qos :
0 }
            },
        }
    ]
};
```

FIG. 4 is a block diagram of an apparatus 400 according to some embodiments. Apparatus 400 may comprise a general- or special-purpose computing apparatus and may execute program code to perform any of the functions described herein. Apparatus 400 may comprise an implementation of one or more elements of system 100. Apparatus 400 may include other unshown elements according to some embodiments.

Apparatus 400 includes a processor 410 operatively coupled to communication device 420, data storage device/memory 430, one or more input devices 440, and one or more output devices 450. Communication device 420 may facilitate communication with external devices, such as application server, a network, or a message broker. Input device(s) 440 may comprise, for example, a keyboard, a keypad, a mouse or other pointing device, a microphone, knob or a switch, an infra-red (IR) port, a docking station, and/or a touch screen. Input device(s) 440 may be used, for example, to manipulate graphical user interfaces and to input information into apparatus 400. Output device(s) 450 may comprise, for example, a display (e.g., a display screen) a speaker, and/or a printer.

Data storage device/memory 430 may comprise any device, including combinations of magnetic storage devices (e.g., magnetic tape, hard disk drives and flash memory), optical storage devices, Read Only Memory (ROM) devices, Random Access Memory (RAM) etc.

The storage device 430 stores an application 412, which includes a generic messaging client 414, for controlling the processor 410. The processor 410 performs instructions of the application 412 and generic messaging client 414 and thereby operates in accordance with any of the embodiments described herein.

The application 412, and generic messaging client 414, may be stored in a compressed, uncompiled and/or encrypted format. They may furthermore include other program elements, such as an operating system, a database management system, and/or device drivers used by the processor 410 to interface with peripheral devices. The generic messaging client 414 may access configuration data 401 specifying parameters which characterize a protocol-specific messaging client for sending/receiving of messages using data streams.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A method for sending and/or receiving messages in a computer system having memory and a processor, the method comprising:
    configuring said memory to have one or more streams connecting a generic messaging client to one or more protocol-specific messaging clients, wherein the one or more streams send messages to and/or receive messages from one or more protocol-specific messaging clients, wherein said streams are formed by:
        providing configuration data comprising one or more destination definitions, wherein:
            each of said destination definitions corresponds to one of said protocol-specific messaging clients,
            each of said destination definitions has a specified messaging protocol and one or more stream definitions corresponding to said streams,
                each of said stream definitions has parameters associated with the specified messaging protocol of a corresponding one of said destination definitions; and providing, in code for said generic messaging client, at least one stream object specifying one of said destination definitions and one of said stream definitions.

2. The method of claim 1, wherein each of said destination definitions comprises a network host and a port.

3. The method of claim 1, wherein each of said stream definitions comprises a stream name and a message topic parameter.

4. The method of claim 1, wherein said stream object is created based on the configuration data provided via a client options object.

5. The method of claim 1, wherein the forming of the streams further comprises providing, in the code for said generic messaging client, a stream converter which pipes a converted input stream to an output stream.

6. The method of claim 5, wherein the stream converter performs a mathematical operation on values in the input stream to produce corresponding converted values in the output stream.

7. A computer system for sending and/or receiving messages, the system comprising:
 a memory storing processor-executable instructions; and
 a processor which executes the processor-executable instructions to cause the system to perform:
 configuring said memory to have one or more streams connecting a generic messaging client to one or more protocol-specific messaging clients, wherein the one or more streams send messages to and/or receive messages from one or more protocol-specific messaging clients, wherein said streams are formed by:
  providing configuration data comprising one or more destination definitions, wherein:
   each of said destination definitions corresponds to one of said protocol-specific messaging clients,
   each of said destination definitions has a specified messaging protocol and one or more stream definitions corresponding to said streams,
    each of said stream definitions has parameters associated with the specified messaging protocol of a corresponding one of said destination definitions; and
  providing, in code for said generic messaging client, at least one stream object specifying one of said destination definitions and one of said stream definitions.

8. The system of claim 7, wherein each of said destination definitions comprises a network host and a port.

9. The system of claim 7, wherein each of said stream definitions comprises a stream name and a message topic parameter.

10. The system of claim 7, wherein said stream object is created based on the configuration data provided via a client options object.

11. The system of claim 7, wherein the forming of the streams further comprises providing, in the code for said generic messaging client, a stream converter which pipes a converted input stream to an output stream.

12. The system of claim 11, wherein the stream converter performs a mathematical operation on values in the input stream to produce corresponding converted values in the output stream.

13. A non-transitory computer-readable medium storing program instructions executed by a processor of a computer system having memory, the medium comprising instructions for causing the processor to perform:
 configuring said memory to have one or more streams connecting a generic messaging client to one or more protocol-specific messaging clients, wherein the one or more streams send messages to and/or receive messages from one or more protocol-specific messaging clients, wherein said streams are formed by:
  providing configuration data comprising one or more destination definitions, wherein
   each of said destination definitions corresponds to one of said protocol-specific messaging clients,
   each of said destination definitions has a specified messaging protocol and one or more stream definitions corresponding to said streams,
    each of said stream definitions has parameters associated with the specified messaging protocol of a corresponding one of said destination definitions; and
  providing, in code for said generic messaging client, at least one stream object specifying one of said destination definitions and one of said stream definitions.

14. The non-transitory computer-readable medium of claim 13, wherein each of said destination definitions comprises a network host and a port.

15. The non-transitory computer-readable medium of claim 13, wherein each of said stream definitions comprises a stream name and a message topic parameter.

16. The non-transitory computer-readable medium of claim 13, wherein said stream object wherein said stream object is created based on the configuration data provided via a client options object.

17. The non-transitory computer-readable medium of claim 13, wherein the forming of the streams further comprises providing, in the code for said generic messaging client, a stream converter which pipes a converted input stream to an output stream.

18. The non-transitory computer-readable medium of claim 11, wherein the stream converter performs a mathematical operation on values in the input stream to produce corresponding converted values in the output stream.

19. The method of claim 1, wherein the generic messaging client exposes the one or more defined streams via an Application Programming Interface (API).

* * * * *